United States Patent [19]

Thoemke

[11] 4,388,774
[45] Jun. 21, 1983

[54] FISHING SYSTEM

[76] Inventor: Dale W. Thoemke, P.O. Box 703, Buckley, Wash. 98321

[21] Appl. No.: 227,750

[22] Filed: Jan. 23, 1981

[51] Int. Cl.³ ........................ A01K 97/10; B63B 35/14
[52] U.S. Cl. ..................................... 43/21.2; 43/274; 43/42.74; 114/255
[58] Field of Search ................... 43/21.2, 42.74, 43.12, 43/4, 4.5, 27.4; 114/255; 248/538; 212/190, 224, 249, 253, 74, 269

[56] References Cited

U.S. PATENT DOCUMENTS

| | | | |
|---|---|---|---|
| 1,894,428 | 1/1933 | Shiraishi et al. | 114/255 |
| 2,291,380 | 7/1942 | Dibert | 114/255 |
| 2,541,893 | 2/1951 | Speer | 212/190 X |
| 2,727,707 | 12/1955 | Wells | 248/514 |
| 2,733,536 | 2/1956 | Terazono | 43/42.74 |
| 2,851,234 | 9/1958 | Scheifele | 248/538 |
| 3,193,964 | 7/1965 | Hurst | 43/43.12 |
| 3,285,431 | 11/1966 | Butcher | 212/269 X |
| 3,532,309 | 10/1970 | Reddick | 248/512 |
| 3,601,919 | 8/1971 | Nixon | 248/515 X |
| 3,797,432 | 3/1974 | Mermudez | 114/255 |
| 3,959,913 | 6/1976 | Weber | 43/43.12 |
| 4,106,811 | 8/1978 | Hernandez | 297/193 |
| 4,157,803 | 6/1979 | Mack | 248/512 |
| 4,221,068 | 9/1980 | Roemer | 43/43.12 |
| 4,315,612 | 2/1982 | Levine et al. | 248/538 |

Primary Examiner—Nicholas P. Godici
Assistant Examiner—Charles L. Willis
Attorney, Agent, or Firm—John O. Graybeal

[57] ABSTRACT

A fishing system for a recreational, commercial or pleasure type boat (B) includes an inner pair of fishing poles (10) mounted near the gunwales (GW) of boat (B) to position inner fishing lines (12) closely adjacent the sides of boat (B). A rearwardly extending pair of fishing poles (14) are carried by holders (16) mounted on the stern of boat (B) to position lines (18) laterally inwardly of lines (12). An outer pair of fishing poles (20) are mounted on the outward end portions of elongate booms (38) to position outer lines (24) at a location a relatively large distance laterally outwardly from lines (12). Booms (38) are disposed transversely to the length of boat (B) and are supported by antifriction support assemblies (40) which support booms (38) for extensional travel outwardly from one side of boat (B) and for retractional travel towards the opposite side of boat (B).

15 Claims, 4 Drawing Figures

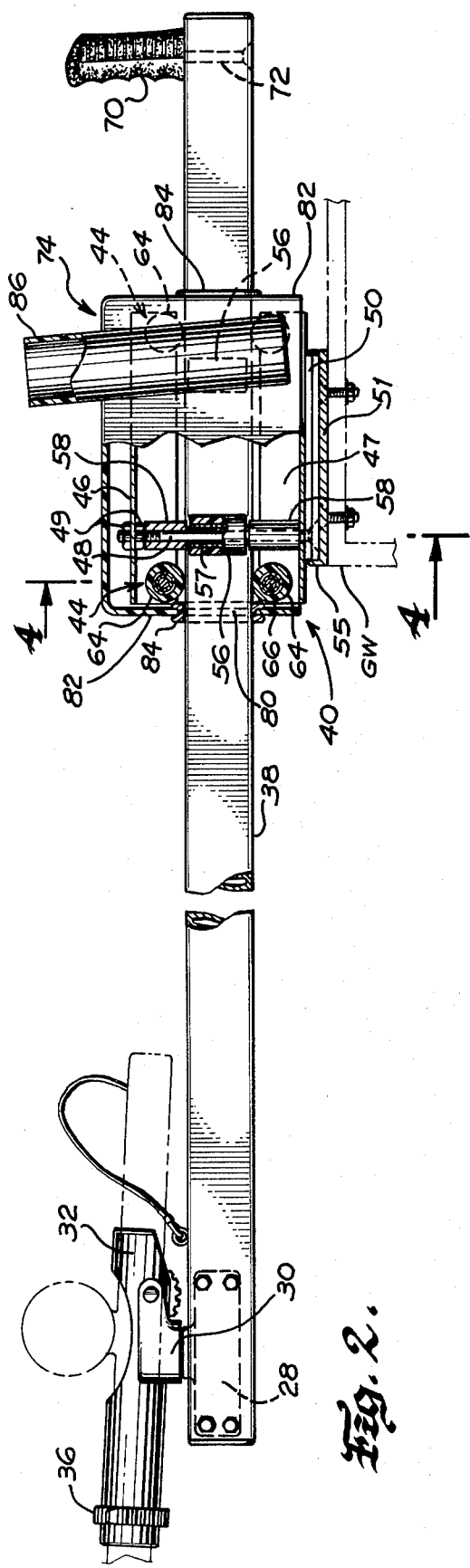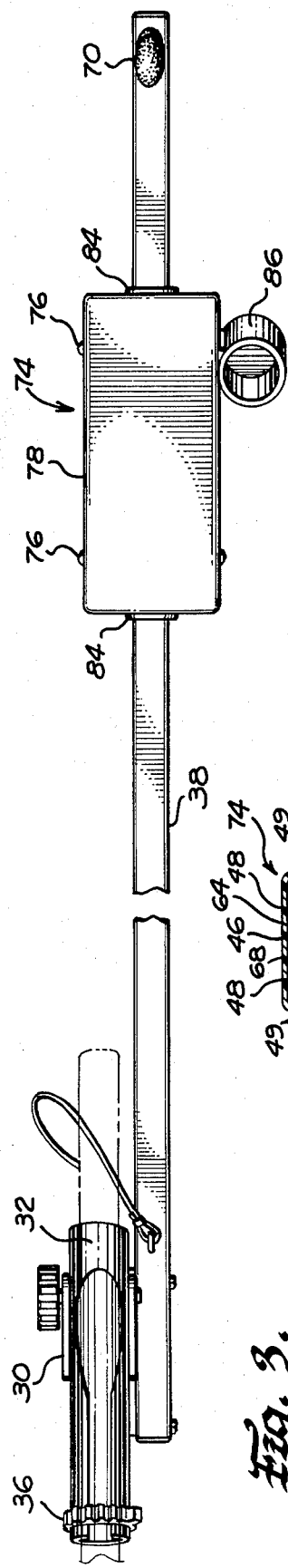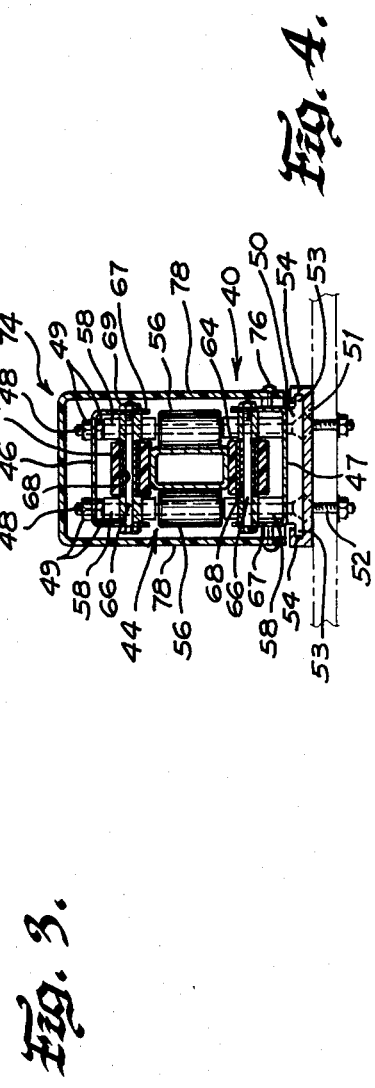

FISHING SYSTEM

DESCRIPTION

1. Technical Field

The present invention relates to fishing systems, and more particularly to apparatus for supporting fishing poles to position fishing lines at various locations relative to the longitudinal center of a boat.

When fishing from a boat, especially during trolling with several lines, the fishing lines must be kept apart from each other to prevent tangling, particularly when making a turn. Whether the fishing poles are held by fishermen or by known holding devices mounted on the boat, only a limited number of poles and lines can be used at a time without tangling the lines.

2. Background Art

The prior art includes various apparatus for supporting fishing rods from the gunwale or deck of a boat. U.S. Pat. No. 4,157,803 discloses a fishing rod holding device composed of an elongate beam extending across the boat from gunwale to gunwale. Four cylindrical rod holders are welded to the beam at various locations along the length of the beam, with each holder adapted to receive the handle of a fishing rod. Although this type of device may relieve the fisherman from having to hold a rod at all times, the maximum distance that a fishing line may be disposed laterally outwardly from the side of the boat is limited to a distance somewhat shorter than the length of the fishing pole being used since the handle of the pole is held within the confines of the boat.

U.S. Pat. Nos. 2,727,707 and 3,532,309 both concern fishing pole holders capable of supporting a fishing pole a various angular inclinations from a side surface or from the gunwale of a boat. The holder disclosed in the '309 patent can be selectively positioned at various locations along a line extending transversely to the length of the boat; however, at no time does the handle of the pole extend laterally outwardly beyond the hull of the boat. Moreover, the holders disclosed in both these patents are rather complicated in construction, each composed of many individual components which must be specially fabricated.

U.S. Pat. No. 4,106,811 involves a collapsible equipment which includes a fishing rod holder mounted on each lateral side of a seat on which a fisherman can rest while fishing. The seat serves as the top of a fish container. Although their equipment is designed to be portable, unless it is secured to the deck of a boat or filled with a large quantity of water, the apparatus could accidentally tip over if the boat rocks to any significant degree or if a fish strikes one of the lines.

A T-shaped spreader bar for fishing lines is disclosed by U.S. Pat. No. 2,733,536. The spreader includes two elongate arms slidably interconnected together in longitudinal alignment to enable the total length of the arms to be varied. A third arm of fixed length extends transversely outwardly from the two sliding arms to form the leg portion of the T-shape. A hook support line depends downwardly from the outer ends of each of the arms. The spreader is adapted to be connected to the lower end of a fishing line through the intermediacy of a swivel eye. The spreader suffers from the disadvantage that it is rather cumbersome to support, especially if attached to the line of a fishing pole. Also, if a fish strikes one of the lines, the spreader may rock or rotate, thereby causing the hook support lines to be tangled together.

U.S. Pat. Nos. 1,894,428 and 2,291,380 both disclose platforms for supporting fishermen at locations laterally outwardly from the hull of a boat. The platforms must be constructed with significant structural integrity to safely support fishermen. Accordingly, because of their size and weight, it is impractical to mount such platforms on smaller size boats, such as the size of boats typically equipped with an outboard or an inboard/outboard motor.

DISCLOSURE OF INVENTION

The present invention relates to a fishing system for supporting a plurality of fishing poles on a boat to position the fishing lines carried by the poles in an array spaced laterally apart from each other a distance sufficient not only to prevent the fishing lines from tangling with each other during trolling, especially while making a turn, but also to sweep a wider path than would be possible if the poles are only held by rod holders on the boat itself, or held by the fishermen. The fishing system includes a first pair of fishing pole holders for holding a first pair of fishing poles so that their lines are disposed outwardly adjacent each side of the boat. A second pair of fishing pole holders support a second pair of fishing poles to position the lines carried by such poles at locations either spaced outwardly from the first fishing lines or extending rearwardly of the boat. The fishing system includes a further pair of fishing pole support mechanisms for supporting a third pair of fishing poles to position lines carried thereby laterally of the second fishing lines at locations outwardly from the side of the boat a distance greater than the length of the third fishing poles. Accordingly, the third fishing lines are located further away from the side of the boat and from the other lines than would be possible if the third fishing poles were held by fishermen.

Each of the third fishing pole support mechanisms includes an elongate, rectangular boom positioned generally transversely to the length of the boat so that the two booms are disposed in close, spaced parallel relationship to each other. A support assembly composed of two sets of rollers support each boom for extensional travel laterally outwardly from one side of the boat and for retractional travel towards the opposite side of the boat. Each of the sets of rollers is composed of two pairs of rollers with the rollers of each pair positioned in opposed relationship to each other to roll against opposite sides of the boom. Accordingly, the two pairs of rollers in each set are disposed transversely to each other to collectively define a rectangularly shaped opening for receiving the boom between them. By this arrangement, the rollers support the boom for longitudinal movement while preventing the boom from rotating about its longitudinal axis.

A third fishing pole holder is mounted on the other end portion of each boom for holding a third fishing pole to extend generally longitudinally outwardly from the boom. Also, a handle is mounted on the inner end portion of each of the booms to permit a fisherman to manually extend the boom to position the third fishing pole a substantial distance outwardly from the side of the boat and also to conveniently retract the boom to retrieve the pole when desired, such as to reel in a fish or rebait a hook. Moreover, when not in use, the booms can be retracted so that they extend only a minimum distance, if at all, outwardly from the sides of the boat.

The above described fishing system enables at least six fishing lines to be simultaneously in use on a rather small boat without causing tangling of the lines. Also, since the above fishing system eliminates the need for the poles to be continuously held by fishermen, it is possible for more lines to be in use than the number of fishermen on the boat. Furthermore, once a fish is hooked on one of the lines, the remainder of the lines can be conveniently reeled in to prevent tangling of the lines.

BRIEF DESCRIPTION OF THE DRAWINGS

The details of one typical embodiment of the present invention will be described in connection with the accompanying drawings, in which:

FIG. 2 is an enlarged elevational view, with portions broken away for clarity, specifically illustrating the construction of a fishing pole support apparatus;

FIG. 3 is an enlarged top view of the fishing pole support apparatus illustrated in FIG. 2; and, FIG. 4 is an enlarged cross-sectional view of the support apparatus illustrated in FIGS. 2 and 3, taken substantially along lines 4—4 of FIG. 2.

BEST MODE OF THE INVENTION

Figure 1:
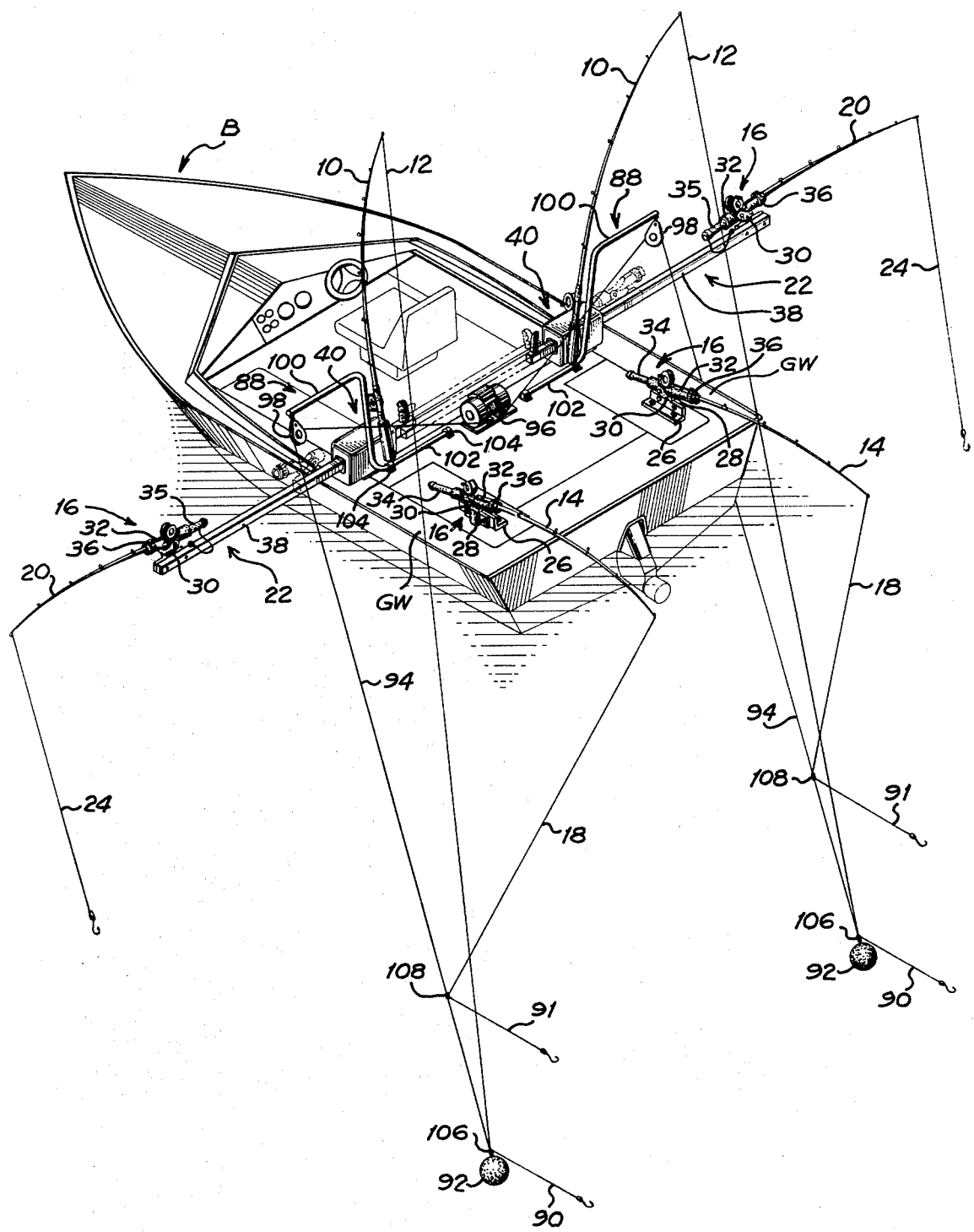
FIG. 1 is an isometric view of a fishing system constructed according to the present invention illustrating six fishing poles and lines in simultaneous use on a rather small boat.

Referring initially to FIG. 1, a fishing system constructed according to the best mode of the present invention currently known to applicant is illustrated as used in conjunction with a typical recreation or pleasure type boat B (with a 20' length and 8' beam, for example), powered at a trolling speed by an inboard-outboard drive system. The fishing system includes an inner pair of fishing poles 10 mounted in substantially upright orientation near the gunwales GW of boat B to thereby position inner fishing lines 12 closely adjacent the sides of boat B. A rear pair of fishing poles 14 are carried by holders 16 mounted near the intersection of the stern and each gunwale of boat B. Poles 14 are positioned to extend generally rearwardly from the sides of boat B to position lines 18 laterally inwardly of lines 12. An outer pair of fishing poles 20 are mounted on support apparatuses 22 through the intermediacy of holders 16 which ae constructed identically to the ones used to hold rear poles 14 and mounted on elongate booms 38. Booms 38 support poles 20 a significant distance laterally outwardly from the sides of boat B to thereby position outer lines 24 laterally outwardly from lines 12.

Referring to FIGS. 1-3, holders 16 which support rear poles 14 are mounted on brackets 26 extending upwardly from gunwale GW of boat B while holders 16 which support outer poles 20 are mounted on the sides of booms 38. Each holder 16 is composed of a pivot block 28 bolted to bracket 26 or boom 38 by appropriate conventional hardware. Holder 16 also includes a yoke 30 having a downwardly extending stub shaft which journals within a socket integrally formed with pivot block 28 to thereby rotate about a vertical axis. Holder 16 further includes an elongate cradle 32 for receiving the handle portions 34 of rods 14 or handle portions 35 of rods 20. Cradle 32 is pinned to yoke 30 to pivot about a horizontal axis to thereby vary the angle of tilt of pole 14. A rotatable, split collar 36 is mounted on the forward end of each cradle 32 to hold the rods captive within cradle 32 while allowing convenient access to the rods when mounting them on or removing them from holders 16. Although rods 14 are illustrated as extending generally horizontally rearwardly, the rods can be rotated about a vertical axis to extend laterally of the sides of boat B and also tilted about a horizontal axis to other desired attitudes. Rods 20 can also be rotated about a vertical axis and tilted about a horizontal axis.

Next referring to FIGS. 1-4, each outer poles 20 is mounted on a retractable support apparatus 22. Support apparatus 22 includes an elongate boom 38 disposed transversely to the length of boat B. Boom 38 is supported by a support assembly 40 for extensional travel along its length in a direction laterally outwardly from a side of boat B and for retractional travel in a direction toward the opposite side of the boat. As discussed above, holder 16 is mounted on the outward end portion of boom 38 to support rod 20 to extend outwardly beyond the end of the boom.

As best illustrated in FIGS. 2-4, booms 38 are rectangular in cross section and hollow in construction to thereby provide lightweight but structurally strong members. Preferably, the booms are either constructed from corrosion resistant material or coated or painted with a moisture impervious material. The ends of the booms can be capped to protect their interiors from sea air, salt water or other corrosive elements. Also, the length of the booms could be limited to approximately the width of boat B so that when the booms are retracted, they do not extend any significant distance over either side of the boat while still enabling rods 20 to be disposed outwardly far enough from each side of the boat to position lines 24 a sufficient distance laterally of lines 12 to prevent the lines from tangling.

Again referring specifically to FIGS. 2-4, each support apparatus 22 includes two roller sets 44 which are mounted on gunwale GW in spaced apart relationship along the length of boom 38. Each roller set 44 of each support apparatus 22 is constructed identically, but orientated 180° from each other to thus, in side elevation, appear as mirror images of each other. Sets 44 are interconnected by pairs of vertically spaced apart upper and lower channel brackets 46 and 47, respectively, which are disposed so that their webs face oppositely and their flanges face towards each other. Channel brackets 46 and 47 are vertically separated by elongate shafts 48 with the upper end of each shaft extending through a clearance hole provided in the web portions of bracket 46. A pair of nuts 49 are threadably engaged with the threaded upper end of shaft 48 to sandwich upper channel bracket 46 between them. The lower channel bracket 47 rests on and is fixed to a flat, rectangularly-shaped base plate 50 which in turn slidably engages with and disengages from a mounting bracket 51 secured to gunwale GW by conventional hardware such as screw and nut assemblies 52. Base plate 50 has flanges 53 extending along its sides which are slidably receivable within channels 54 formed along each side of bracket 51. Bracket 51 also includes an endwall 55 which prevents plate 50 from sliding beyond the end of the bracket and outwardly of the side of boat B.

The lower end portions of vertical shafts 48 are welded or otherwise fixedly attached to base plate 51 to extend upwardly therefrom. A cylindrically shaped roller 56 is antifrictionally mounted on a central portion of each vertical shaft 48 through the intermediacy of bushing 47. Each roller 56 is vertically located by a pair of annular spacers 58 which engage over shaft 48 and bear against opposite ends of bushings 57. Although not essential, rollers 56 ideally are formed from nylon, polyurethane or similar tough, corrosion resistant material.

Each roller set 44 also includes a pair of horizontally disposed rollers 64 which are antifrictionally mounted on horizontal shafts in the form of elongate capscrews 66 which span across the width of channel brackets 47 to extend through aligned clearance holes provided in flanges 67 of the brackets. A nut 69 engages with the threaded end portion of capscrews 66 to secure capscrews 66 to flanges 67. Rollers 64 are vertically spaced apart a distance corresponding to the height of boom 38 to thereby roll over the upper and lower surfaces of the boom. As with vertically disposed rollers 56, horizontal rollers 64 are ideally constructed from nylon or polyurethane and also are mounted on capscrews 66 through the intermediacy of bushings 68.

Elongate rollers 56 and 64 collectively define a rectangularly shaped opening corresponding to the cross-sectional profile of boom 38 to thereby closely and slidably receive the boom. The two roller sets 44 of each support apparatus 22 thus support a corresponding boom 38 for relatively free longitudinal travel. Moreover, the flat longitudinal profile defined by the outer surfaces of rollers 46 and 64 provides uniform contact across the entire width of the upper, lower and side surfaces of boom 38 thereby preventing it from rotating about its longitudinal axis or from swinging up or down or laterally.

A manually graspable handle 70 is mounted on the inboard end portion of boom 38 to extend upwardly from the upper surface of the boom. A stud 72 extends downwardly from handle 70 to extend through a clearance hole provided in the upper surface of the boom to threadably engage with a threaded opening formed in the lower surface on the boom. Alternatively, the lower end of stud 72 can be fixed to the lower surface of boom 38 by other conventional methods, for instance by a weldment. Handle 70 is contoured to permit secure gripping thereof when desired to extend or retract the boom.

As illustrated in FIG. 1, ideally support mechanisms 22 are not mounted in alignment with each other, but rather are slightly longitudinally offset along the length of boat B to thereby enable each boom 38 to be fully retracted without interferring with the boom or support mechanism on the opposite side of the boat. It is also to be understood that, rather than being rectangular in shape, boom 38 can be formed in other cross-sectional shapes, such as square or hexagonal. Preferably, in cross-section, the boom includes at least one flat surface which rides against a cylindrical roller, thereby preventing rotation of the boom about its longitudinal axis.

A pole holder 16 is mounted on the forwardly directed face of the outer end portion of each boom 38. The holders permit poles 20 to be adjusted in selective horizontal and vertical orientations while also enabling the poles to be easily and conveniently mounted and dismounted when desired.

Each support apparatus 22 also includes a rectangularly shaped cover 74 which fits downwardly over roller sets 44. Cover 74 is fastened to the flanges of lower bracket 47 by appropriate hardware, such as screws 76, which extend through clearance holes provided in the side walls 78 of the cover. When installed, the lower edges of the cover are spaced slightly above the upper surface of gunwale GW of boat B. A rectangularly shaped opening 80 is provided in each end wall 82 of the cover to permit passage of boom 38. A resilient, U-shaped grommet 84 is mounted within each opening 80 to seal against the sliding boom thereby preventing moisture from reaching the interior of the cover.

Referring next to FIGS. 1-3, a round, tubular-shaped holder 86 for inner pole 10 is fixed to the sidewall 78 of each cover 74 facing the bow of boat B. Holder 86 is tilted slightly away from the longitudinal center of boat B as it extends upwardly to an elevation above the top surface of the cover to thereby support pole 10 in generally upright, laterally outwardly tilting orientation so that corresponding lines 12 extend downwardly from the tip of the pole relatively closely adjacent the sides of boat B. Holder 86 is formed with an inside diameter sized to downwardly receive the handle portion of conventional fishing poles. It is to be understood that rather than being fixed to cover 74, holder 86 can be constructed as a separate unit and, as such, mounted on gunwale GW of boat B.

As best illustrated in FIG. 1, deep water sinker systems 88 may be used in conjunction with inner lines 12 and rear lines 18 to thereby drive inner line leaders 90 and rear line leaders 91 to a depth substantially below the maximum depth of outer lines 24. Each sinker system 88 includes a large spherically-shaped weight 92 attached to the lower end of a sinker line 94 which in turn is spooled on an electrically powered winch 96 centrally mounted on boat B between the two inner rods 10. Each sinker line 94 is supported by a pulley 98 which in turn is suspended from the free end portion of a Z-shaped davit 100 at an elevation above gunwale GW and slightly outboard of the sides of boat B. The lower leg portion 102 of davit 100 is secured to boat B by clamps 104. A conventional, releasible catch mechanism 106 is fixed to each weight 92 to hold leader 90 nominally captive during trolling and then automatically released the leader when a fish strikes. When this occurs, winch 96 can be operated to simultaneously reel in both sinker lines 94. Also, another conventional catch mechanism 108 is fixed to each sinker line 94 a short distance, for example twenty feet, from weight 92 to hold a leader 91 for rear lines 18 nominally captive and then automatically release the leader when a fish strikes. By the above described arrangement of sinker system 88, leader 91 is disposed above a corresponding inner line leader 90 by approximately the vertical distance separating weight 92 and upper catch mechanism 108.

From the above description, it can be appreciated that the present invention supports at least six fishing poles at various locations transversely of boat B to thereby position corresponding fishing lines far enough apart not only to prevent them from tangling during trolling, even when making a turn, but also to sweep a rather broad path to attract more fish then would be possible if the lines were located closer to the boat. When a fish strikes any of the lines, the remainder of the lines can be conveniently reeled in to prevent entanglement with the line having a fish on. To this end outer poles 20 can be conveniently retrieved by pulling on handle 70 to retract boom 38. Also, holders 16 and 86 can be used to hold the fishing poles when desired so that the poles do not have to be continuously manually held.

As will be apparent to those skilled in the art to which the invention is addressed, the present invention may be embodied in forms and embodiments other than those specifically disclosed above, without departing from the spirit or essential characteristics of the invention. The particular embodiment of the fishing system described above, is therefore to be considered in all respects as illustrative and not restrictive, i.e. the scope of the present invention is as set forth in the appended claims rather than being limited to the example of the fishing system as set forth in the foregoing description.

What is claimed is:

1. A retractable fishing pole support apparatus for supporting a fishing pole within a holder to position a fishing line laterally outwardly from the side of a boat a distance greater than the length of the fishing pole, said support apparatus comprising:

an elongate boom disposed generally transversely to the length of the boat, said boom having an inner end portion and an outer end portion for mounting the fishing pole holder and being of a length approximating the beam width of the boat;

an antifriction support assembly for supporting said boom for extensional travel outwardly from one side of the boat and for retractional travel towards the opposite side of the boat;

handle/stop means mounted on the inner end portion of said boom for manually extending and retracting said boom and for limiting the extensional travel of said boom;

said boom being rectangular in cross section and said support assembly including at least two sets of roller means spaced apart along the length of said boom, each of said sets of roller means comprising two pairs of rollers with the rollers of each pair disposed in spaced parallel relationship to each other to bear against opposite sides of said boom and with the rollers of one pair disposed transversely to the rollers of the second pair, the said sets of roller means supporting said boom for longitudinal movement while preventing rotational movement of said boom about its longitudinal axis;

said support assembly further including a pair of channel-shaped brackets disposed in spaced parallel relationship to each other with their web portions facing away from each other; and the ends of one pair of rollers of each set of roller means is connected to the web portions of said channel brackets and the end portions of the second pair of said rollers of each set of roller means is connected to the flange portions of a corresponding channel bracket to thereby maintain the two pairs of rollers of each set of roller means in fixed transverse orientation relative to each other.

2. A retractable fishing pole support apparatus for supporting a fishing pole within a holder to position a fishing line laterally outwardly from the side of a boat a distance greater than the length of the fishing pole, said support apparatus comprising:

an elongate boom disposed generally transversely to the length of the boat, said boom having an inner end portion and an outer end portion for mounting the fishing pole holder and being of a length approximately the beam width of the boat;

an antifriction support assembly for supporting said boom for extensional travel outwardly from one side of the boat and for retractional travel towards the opposite side of the boat;

handle/stop means mounted on the inner end portion of said boom for manually extending and retracting said boom and for limiting the extensional travel of said boom; and said support apparatus further comprising cover means to enclose said support assembly, said cover means including clearance openings for slidably receiving said boom, and seal means mounted within each of said cover means openings to seal against said boom to thereby prevent moisture from entering into the interior of said cover means.

3. A fishing system for supporting a plurality of fishing poles on a boat to position fishing lines in an array spaced laterally apart from each other relative to the length of the boat, said fishing system comprising:

a first pair of fishing pole holder means for removably holding a first pair of fishing poles to position a first pair of fishing lines outwardly adjacent respective sides of the boat;

a second pair of fishing pole holder means for removably holding a second pair of fishing poles and having pivot means mounting the same so that the fishing poles held therein extend either:

transversely to the length of the boat to position a second pair of fishing lines laterally outwardly of respective sides of the boat at respective locations spaced outwardly from a corresponding fishing line of the first pair of fishing lines, or, longitudinally rearwardly relative to the length of the boat to position a second pair of fishing lines laterally inwardly of respective sides of the boat; and a pair of fishing pole support means for supporting a third pair of fishing poles to position a third pair of fishing lines laterally of respective sides of the boat at respective locations spaced outwardly from a corresponding fishing line of the second pair of fishing lines each of such latter two fishing pole support means including:

a rigid, elongate boom disposed generally transversely to the length of the boat and having an outer end portion and an inner end portion and of a length approximating the beam width of the boat, a fishing pole holder means mounted on the outer end portion of said boom and holding the handle of a fishing pole so that the pole extends generally outwardly from the outer end portion of said boom, an antifriction support assembly fixedly mounted adjacent the gunwale of the boat and supporting said boom for rectilinear and retractional movement of said boom toward and away from the longitudinal center of the boat, and manually graspable handle means mounted on the inner end portion of the boom for manually extending and retracting the boom.

4. A fishing system according to claim 3, wherein:

said boom includes a plurality of planar exterior surfaces extending along the length of said boom; and said support assembly includes pairs of longitudinally spaced apart, antifrictionally mounted rollers, with at least one pair of rollers bearing against each exterior surface of said boom, said pairs of rollers supporting said boom for longitudinally extending and retracting movement while preventing said boom from rotating about its longitudinal axis.

5. A fishing system according to claim 3, wherein:

said boom includes a plurality of flat exterior surfaces extending along the length of said boom;

said support assembly includes at least two sets of roller means spaced apart along the length of said boom, each of said roller means sets including a plurality of rollers disposed relative to each other so that at least one roller bears against each of the outer surfaces of said boom; and whereby said roller means sets support said boom for longitudinal movement along the length of said boom while preventing rotational movement of said boom about its longitudinal axis.

6. A fishing system according to claim 3, wherein said support assemblies are mounted on the boat at locations longitudinally offset relative to each other with respect to the length of the boat to thereby position said booms in close parallel relationship to each other.

7. A fishing system for supporting a plurality of fishing poles on a boat to position fishing lines in an array spaced laterally apart from each other relative to the length of the boat, said fishing system comprising:

a first pair of fishing pole holder means for removably holding a first pair of fishing poles to position a first fishing line outwardly adjacent each side of the boat;

a second pair of fishing pole holder means for removably holding a second pair of fishing poles and having pivot means mounting the same so that the fishing poles held therein extend either;

transversely to the length of the boat to position a second fishing line laterally outwardly of each side of the boat at a location spaced outwardly from a corresponding first fishing line, or, longitudinally rearwardly relative to the length of the boat to position a second fishing line laterally inwardly of each side of the boat; and a pair of fishing pole support means for supporting a third pair of fishing poles to position a third fishing line laterally of each side of the boat at a location spaced outwardly from a corresponding second fishing line, each of the two fishing pole support means including:

an elongate boom disposed generally transversely to the length of the boat and having an outer end portion and an inner end portion and of a length approximating the beam width of the boat, fishing pole holder means mounted on the outer end portion of said boom for holding a fishing pole to extend generally longitudinally outwardly from the outer end portion of said boom, an antifriction support assembly for supporting said boom for extensional and retractional movement of said boom toward and away from the longitudinal center of the boat, and manually graspable handle means mounted on the inner end portion of the boom for manually extending and retracting the boom, and said fishing system further comprising cover means for enclosing said support assembly, said cover means having clearance openings for slidably receiving said boom and seal means mounted in each of said openings to slide against said boom to thereby prevent moisture from reaching the interior of said cover means.

8. A fishing system according to claim 7, wherein each of said first fishing pole holder means includes a generally upright socket integrally formed with said cover means for supporting the fishing pole held thereby in generally upright orientation so that its line extends downwardly from the end of the pole at a location laterally adjacent the side of the boat.

9. A retractable fishing assembly for positioning a fishing line at locations laterally outwardly from the side of a boat, said assembly comprising:

a rigid, elongate boom disposed generally transversely to the length of the boat, said boom being of a beam width approximating the beam width of the boat and having an inner end portion, an outer end portion for mounting fishing line support means, and a plurality of exterior surfaces extending along the length of the boom with at least one of the surfaces being planar, an antifriction roller assembly fixedly mounted adjacent the gunwale of the boat and supporting said boom for rectilinear travel outwardly from one side of the boat and for retractional travel toward the opposite side of the boat, said roller assembly including a plurality of pairs of antifriction rollers longitudinally spaced apart along the length of said boom with at least one pair of said rollers bearing against each exterior surface of said boom to thereby support said boom for extensional and retractional movement transversely of the length of the boat while preventing rotational of said boom about its longitudinal axis, and fishing line support means rigidly supported at and selectively removable from the outer end portion of said boom and including a fishing line support element located outboardly of the outer end of said boom.

10. A fishing assembly according to claim 9, wherein the fishing line support means includes a fishing pole and a holder mounted on the outer end portion of said boom for receiving the fishing pole.

11. A fishing assembly according to claim 9, further including handle/stop means mounted on the inner end portion of said boom for manually extending and retracting said boom and for limitng the extensional travel of said boom.

12. A retractable fishing pole support apparatus for supporting a fishing pole within a holder to position a fishing line laterally outwardly from the side of a boat a distance greater than the length of the fishing pole, said support apparatus comprising:

a rigid, elongate boom disposed generally transversely to the length of the boat, said boom having an inner end portion and an outer end portion on which the fishing pole holder is mounted, said boom being of a length approximating the beam width of the boat;

an antifriction support assembly fixedly mounted adjacent the gunwale of the boat and supporting said boom for rectilinear travel outwardly from one side of the boat and for retractional travel toward the opposite side of the boat;

handle/stop means mounted on the inner end portion of said boom for manually extending and retracting said boom and for limiting the extensional travel of said boom, and a fishing pole arranged with the handle thereof in said fishing pole holder and extending outwardly of the boom beyond the outer end of the boom.

13. A support apparatus according to claim 12, wherein:

said boom includes a plurality of exterior surfaces extending along the length of said boom with at least one of said surfaces being planar; and said support assembly includes a plurality of pairs of antifriction rollers longitudinally spaced apart along the length of said boom, with at least one pair of said rollers bearing against each exterior surface of said boom to thereby support said boom for longitudinal extension and retraction movement while preventing rotation of said boom about its longitudinal axis.

14. A support apparatus according to claim 13, wherein the longitudinal profile of each of said rollers of each pair matches the transverse profile of the corresponding outer surface of said boom which said pairs of rollers bear against.

15. A support apparatus according to claim 14, wherein each of the outer surfaces of said boom is flat, and in longitudinal profile each of said rollers is straight.

* * * * *